US008253006B2

(12) United States Patent
Kim

(10) Patent No.: US 8,253,006 B2
(45) Date of Patent: Aug. 28, 2012

(54) METHOD AND APPARATUS TO AUTOMATICALLY MATCH KEYS BETWEEN MUSIC BEING REPRODUCED AND MUSIC BEING PERFORMED AND AUDIO REPRODUCTION SYSTEM EMPLOYING THE SAME

(75) Inventor: Sung-Yong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 12/346,914

(22) Filed: Dec. 31, 2008

(65) Prior Publication Data

US 2009/0173217 A1 Jul. 9, 2009

(30) Foreign Application Priority Data

Jan. 7, 2008 (KR) ........................ 10-2008-0001865

(51) Int. Cl.
*H02M 5/00* (2006.01)
*G10H 1/20* (2006.01)

(52) U.S. Cl. ............................... 84/619; 84/609; 84/624

(58) Field of Classification Search ..................... 84/619
See application file for complete search history.

(56) References Cited

U.S. PATENT DOCUMENTS

| | | | | |
|---|---|---|---|---|
| 4,520,707 | A * | 6/1985 | Weil et al. | 84/611 |
| 4,690,026 | A * | 9/1987 | McCoy | 84/603 |
| 5,038,658 | A * | 8/1991 | Tsuruta et al. | 84/461 |
| 5,296,643 | A * | 3/1994 | Kuo et al. | 434/307 A |
| 5,502,274 | A * | 3/1996 | Hotz | 84/613 |
| 5,864,079 | A * | 1/1999 | Matsuda | 84/619 |
| 6,160,213 | A * | 12/2000 | Arnold et al. | 84/615 |
| 6,417,438 | B1 * | 7/2002 | Haruyama et al. | 84/619 |
| 7,161,080 | B1 * | 1/2007 | Barnett | 84/613 |

FOREIGN PATENT DOCUMENTS

| | | |
|---|---|---|
| KR | 10-2001-0058808 | 7/2001 |
| KR | 10-2006-0110495 | 10/2006 |

* cited by examiner

*Primary Examiner* — Elvin G Enad
*Assistant Examiner* — Christopher Uhlir
(74) *Attorney, Agent, or Firm* — Stanzione & Kim, LLP

(57) ABSTRACT

A method to automatically match keys between music being reproduced and music being performed includes detecting a key from an audio signal being reproduced from a storage medium or audio source, detecting a key from a sound signal representing music being played by a user, and performing a transposition by adjusting the key of the audio signal to match the key of the sound signal.

12 Claims, 4 Drawing Sheets

METHOD AND APPARATUS TO AUTOMATICALLY MATCH KEYS BETWEEN MUSIC BEING REPRODUCED AND MUSIC BEING PERFORMED AND AUDIO REPRODUCTION SYSTEM EMPLOYING THE SAME

CROSS-REFERENCE TO RELATED APPLICATIONS

This application claims priority under 35 U.S.C. §119(a) from Korean Patent Application No. 10-2008-0001865, filed on Jan. 7, 2008, in the Korean Intellectual Property Office, the disclosure of which is incorporated herein in its entirety by reference.

BACKGROUND OF THE INVENTION

1. Field of the Invention

The present general inventive concept relates to an audio reproduction system, and more particularly, to a method and apparatus to automatically match keys between music being reproduced from an audio source and music being performed on a desired instrument.

2. Description of the Related Art

With an improvement in quality of life, people today have a growing interest in hobby activities, especially, music or playing a musical instrument.

A lot of practice is needed in learning to play a musical instrument. Practicing playing an instrument according to the music being performed or previously performed by a famous artist is effective. Novice performers practicing playing his/her instrument in a certain key rather than in different keys over a short period of time is also effective. However, pieces of music are written in different keys and a piece of music written in a specifically desired key is hard to obtain.

For example, conventionally, when an electronic musical instrument is played to music being reproduced from a CD or mp3 file, a performer had to seek a key in which the music is played and manually change the key of the electronic instrument to the key of the played music. The conventional method of playing an electronic musical instrument has a problem associated with a difficulty for a novice performer to detect the key of music. Another problem is that the performer has to change the setting of the electronic instrument as required.

As another example, if an acoustic musical instrument is played to music being reproduced from a CD or mp3 file, a performer has to select only the music recorded in the desired key. However, changing the key of music or an instrument to a desired key is practically impossible for the performer.

Furthermore, a key matching system currently being used in singing rooms (karaoke rooms) is designed to raise or lower the music key by 2 or 3 octaves according to gender regardless of a key desired by a singer, instead of adjusting a key of a selected piece of music to match a singing voice. Thus, the key matching system cannot fine-tune a pitch to the desired key.

SUMMARY OF THE INVENTION

The present general inventive concept provides a method and apparatus to automatically match keys between music being reproduced and music being performed, to allow transposition to a key desired by a user regardless of a type of instrument or music.

The present general inventive concept also provides an audio reproduction system employing the above method and apparatus.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of automatically matching keys between music being reproduced and music being performed, including detecting a key from an audio signal being reproduced from a storage medium or an audio source, detecting a key from a sound signal representing music being played by a user, and performing a transposition by adjusting the key of the audio signal to match the key of the sound signal.

The foregoing and/or other aspects and utilities of the general inventive concept may also be achieved by providing an apparatus to automatically match keys between music being reproduced and music being performed including a key detecting unit to detect keys of an audio signal produced by an audio source and a sound signal representing music being played by a user, a key processing unit to generate a pitch adjustment signal by using the keys of the audio signal and sound signal, and a pitch changing unit to adjust a pitch of the audio signal according to the pitch adjustment signal.

The foregoing and/or other aspects and utilities of the general inventive concept may also be achieved by providing an audio reproduction system including a signal processor to detect keys from an audio signal being reproduced from an audio source and a sound signal to represent music being played by a user and to adjust the keys of the audio signal to match the key of the sound signal, a user interface to output the keys detected by the signal processor or to input user information, and a communication interface to exchange key information with an electronic musical instrument via a predetermined communication protocol.

The foregoing and/or other aspects and utilities of the general inventive concept may also be achieved by providing an audio reproduction system including a communication interface, and an electronic musical instrument to perform a transposition on notes according to key information or key change information generated via the communication interface.

The foregoing and/or other aspects and utilities of the general inventive concept may also be achieved by providing an audio reproduction method including generating key information or key change information generated via a communication interface, and transposing notes to be performed by an electronic musical instrument according to the generated key information or key change information.

The foregoing and/or other aspects and utilities of the general inventive concept may also be achieved by providing an electronic musical instrument including an audio source, and a signal processor to detect keys from an audio signal being reproduced from the audio source and a sound signal representing music being played by a user and adjusting the keys of the audio signal to match the key of the sound signal.

The signal processor may communicate with a user interface to output the keys detected by the signal processor or to input user information.

The signal processor may communicate with an amplifier to amplify a signal received from the signal processor and input the signal to a multi-channel speaker.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
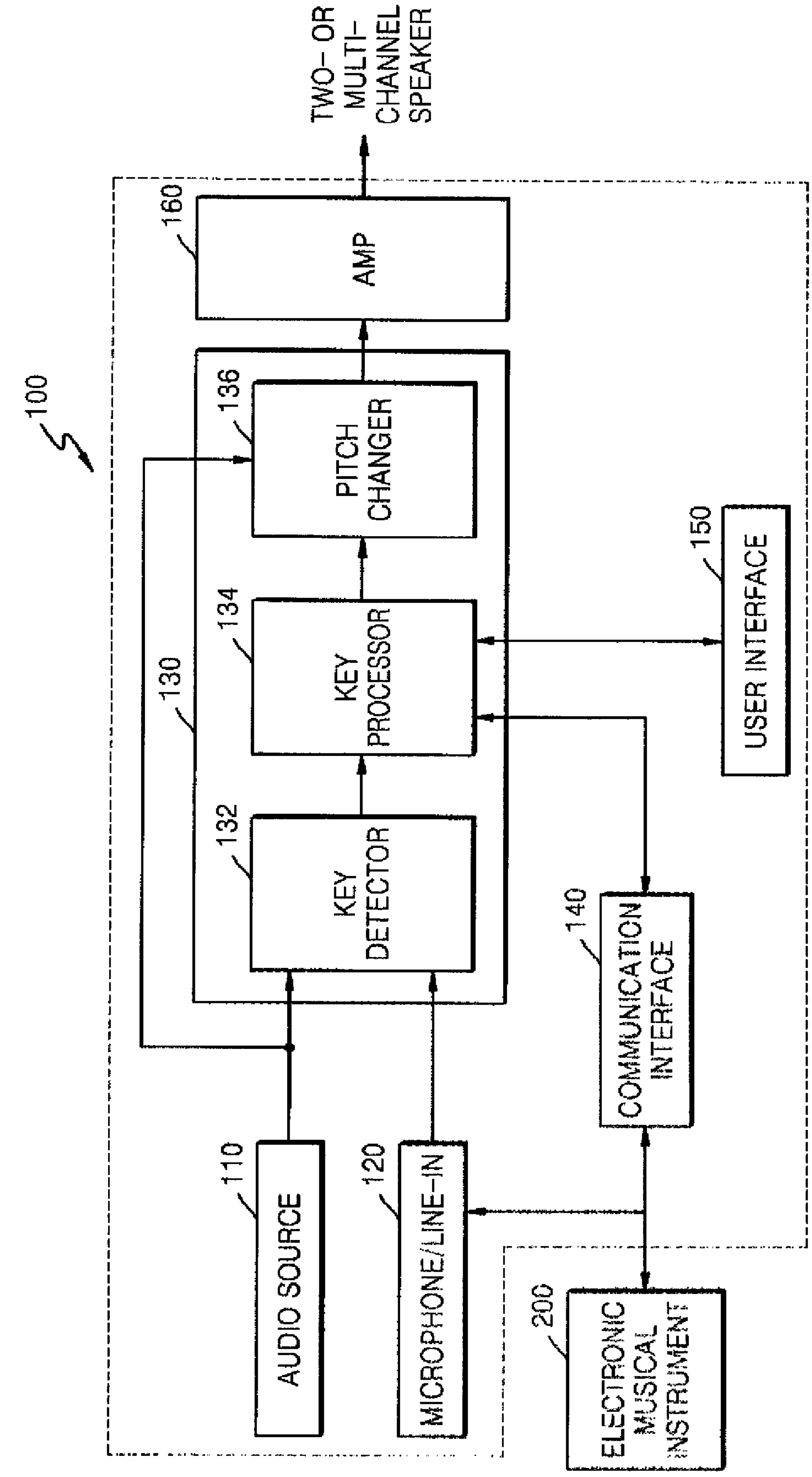
FIG. 1 is a block diagram illustrating an audio reproduction system employing a method of automatically matching keys between music being reproduced and music being performed according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an audio reproduction system 100 employing a method of automatically matching keys between music being reproduced and music being performed according to an embodiment of the present general inventive concept.

Referring to FIG. 1, the audio reproduction system 100 includes an audio source 110, a microphone/line-in 120, a signal processor 130, a communication interface 140, a user interface 150, and an amplifier (AMP) 160. The signal processor 130 includes a key detector 132, a key processor 134, and a pitch changer 136. The audio source 110 or the microphone/line-in 120 can be selectively mounted on an outside or inside of the audio source 100. The audio reproduction system 100 also exchanges key information with an electronic musical instrument 200 via the communication interface 140.

The audio source 110 is connected to the outside or inside of the audio reproduction system 100 and produces a music signal or an audio signal. For example, the audio source 110 may be a CD, DVD, or mp3 file being played on physical media or a source using a network.

The microphone/line-in 120 receives the sound of an acoustic musical instrument or a human voice.

The signal processor 130 detects keys from an audio signal generated by the audio source 110 and a music signal from an instrument being played by a user which is input via the microphone/line-in 120, and performs a key transposition by adjusting the detected keys of the audio signal and the music signal to coincide with each other.

More specifically, the key detector 132 detects a key of an audio signal generated by the audio source 110 and a key of a music signal from an instrument being played by a user or human voice signal. Keys can be detected using various signal processing techniques. In one embodiment, the key detector 132 may analyze frequency characteristics of an audio signal being reproduced from the audio source 110 and extract key information from a fundamental component of the frequency characteristics. Alternatively, the key detector 132 may detect a key from a root note of an acoustic musical instrument that is input via the microphone/line-in 120.

The key processor 134 compares a key of the audio source 110 detected by the key detector 132 with a key of an instrument being played to produce a pitch adjustment signal or key change information and transmits the key information detected by the key detector 132 and the key change information to the communication interface 140 or the user interface 150. The key processor 134 also inputs a key designated by the user via the user interface 150 so as to transmit the input key to the communication interface 140.

The pitch changer 136 changes the pitch of an audio signal produced by the audio source 110 according to the pitch adjustment signal generated by the key processor 134.

Referring to FIG. 1, the AMP 160 amplifies an audio signal output from the pitch changer 136 and outputs the resulting signal via a single or multi-channel speaker.

The user interface 150 acts as an interface between the user and the audio reproduction system 100. The user interface 150 may be realized as a remote control or liquid crystal panel. The user interface 150 allows the user to input key information into the signal processor 130 or transmits key information processed by the signal processor 130 to the user in a form of a graphic image or character.

The communication interface 140 performs communication between the electronic musical instrument 200 and the audio reproduction system 100. That is, the communication interface 140 transmits music data such as key information processed by the signal processor 130 to the electronic musical instrument 200. The communication interface 140 should have a Musical Instrument Digital Interface (MIDI) or a communication protocol such as RS 232c that is common between the electronic musical instrument 200 and the audio reproduction system 100.

The electronic musical instrument 200 is connected to the audio reproduction system 100 via a communication channel such as an MIDI interface and performs a transposition on notes to be performed according to the key information or key change information output via the communication interface 140. The audio reproduction system 100 may include the electronic musical instrument 200. And the electronic musical instrument 200 may operate in response to the internal control signal of the audio reproduction system 100 without a specific communication channel.

Figure 4:
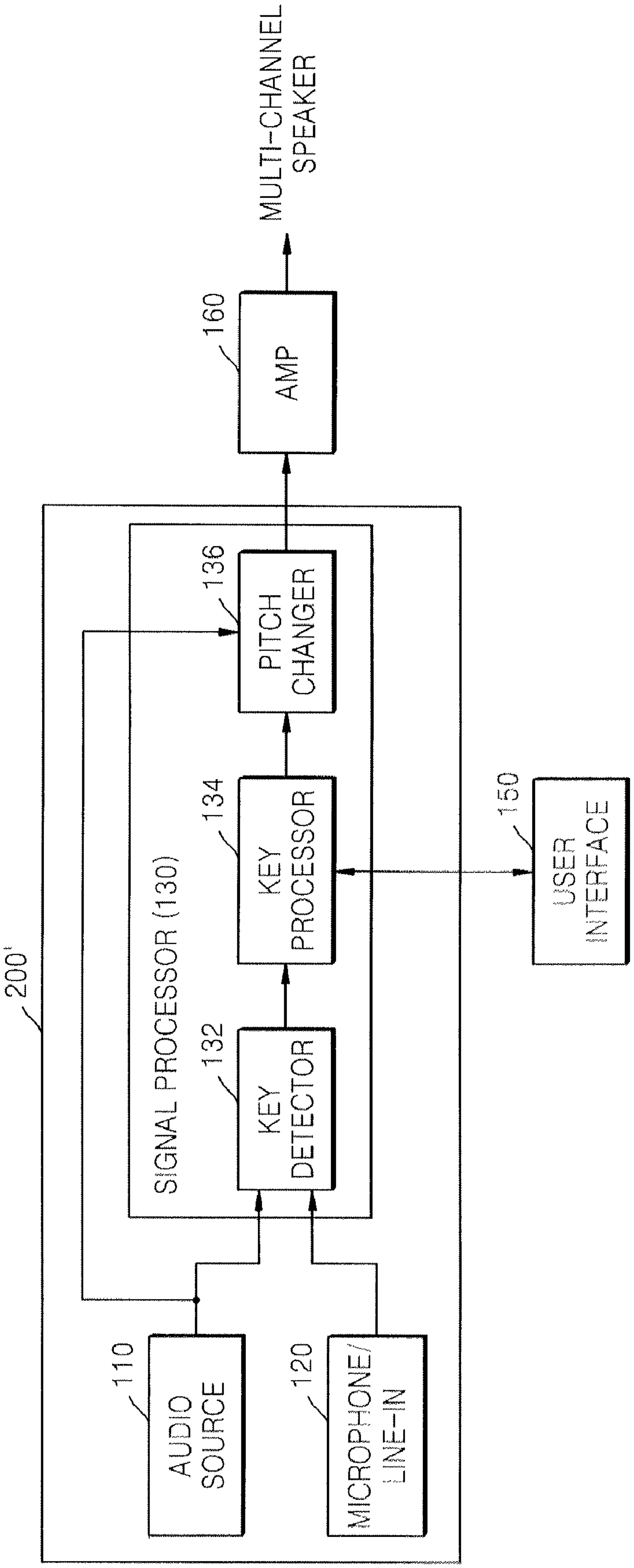
FIG. 4 illustrates an electronic musical instrument according to an embodiment of the present general inventive concept.

FIG. 4 illustrates an electronic musical instrument according to an embodiment of the present general inventive concept. Referring to FIG. 4, in the present embodiment, the electronic musical instrument 200' is similar to the electronic musical instrument 200 of FIG. 1, except that the microphone/line-in unit 120, the signal processor 130 and the audio source 110 are part of the electronic musical instrument 200'. The AMP 160 and the user interface 150 are not limited to being disposed outside of the electronic musical instrument 200', but may also be part of the electronic musical instrument 200'. In another embodiment, the microphone/line-in unit 120 can be replaced with a conventional processing unit to process a sound signal corresponding to music played by a user of the electronic musical instrument 200'.

Figure 2A:
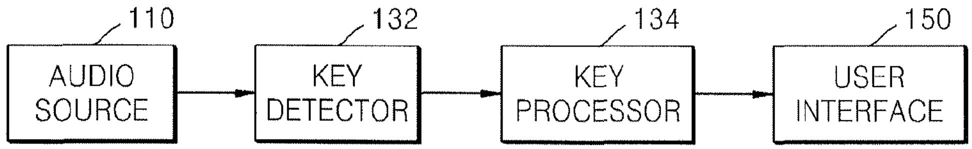
FIGS. 2A through 2C illustrate operations of the system of FIG. 1 according to a type of musical instruments being played.
Figure 2B:
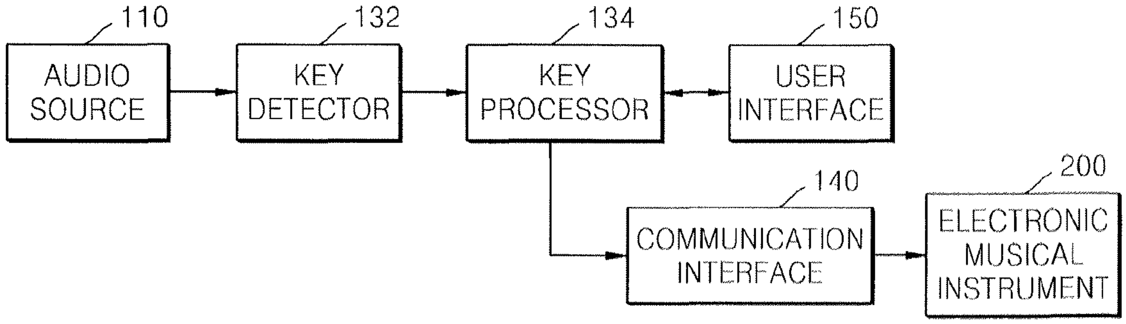
Figure 2C:
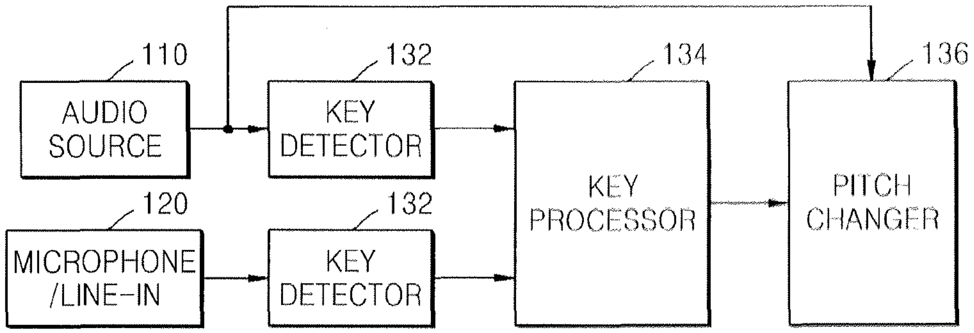

FIGS. 2A through 2C illustrate operations of the audio reproduction system 100 of FIG. 1 according to a type of musical instruments being played.

FIG. 2A is a diagram illustrating an operation of the audio reproduction system 100 of FIG. 1 when a user plays music in a key that is the same as that of music being reproduced from the audio source 110.

Referring to FIG. 2A, the audio source 110 first generates an audio signal. The key detector 132 then detects a key of the generated audio signal. Subsequently, the key processor 134 displays the detected key in the form of a graphic image or character via the user interface 150 so that the user can play music in the displayed key.

FIG. 2B is a diagram illustrating the operation of the audio reproduction system 100 of FIG. 1 when the user plays music in a specific key of the electronic musical instrument 200.

The specific key of the electronic musical instrument 200 indicates a fingering key thereof. In this case, there is no change in a key of the music that the user plays.

Referring to FIG. 2B, the user interface 150 allows the user to designate a fingering key in which he/she desires to play music. For example, if the user desires to play music in the key of "C" on a keyboard of a synthesizer, the user may designate "C" through the user interface 150.

The key detector 132 then detects a key of an audio signal generated by the audio source 110. The key processor 134 notifies the user about the detected key through the user interface 150. If the detected key does not coincide with the fingering key input via the user interface, the key processor 134 then delivers key change information to the electronic musical instrument 200. The electronic musical instrument 200 or the key processor 134 performs transposition to the fingering key desired by the user.

For example, if the user desires to play the electronic musical instrument 200 by using a fingering key of "C" on a synthesizer keyboard when a key of an audio signal being reproduced from the audio source 110 is "D", the user inputs the key of "C" via the user interface 150. The key detector 132 also detects the key of "D" and notifies the key processor 134 about the detected key. The key processor 134 controls the communication interface to set the synthesizer to the key of "D" that is one step higher than the key of "C". Thus, although the user appears to play in the key of "C", the user actually plays in the key of "D", so that the key in which music is performed on the synthesizer coincides with the key of music being reproduced from the audio source 110.

FIG. 2C is a diagram illustrating an operation of the audio reproduction system 100 of FIG. 1 when a user plays music with a specific key of an acoustic musical instrument.

The user connects the acoustic musical instrument to the microphone/line-in 120.

The user subsequently inputs a note corresponding to a root of each key into the microphone/line-in 120 in order to notify the audio reproduction system 100 about the desired key of the user. In this case, if a note does not need to be amplified, the user can hear the note to be played even when the acoustic musical instrument is disconnected from the audio reproduction system 100. Conversely, if a note needs to be amplified, the user can hear the note through the AMP 160 only when the acoustic musical instrument is kept connected to the audio reproduction system 100.

The key detector 132 detects a key desired by the user based on the note input thereto via the microphone/line-in 120. The key processor 134 can notify the user about the detected key via the user interface 150. The key detector 132 also detects a key of an audio signal being generated by the audio source 110. The key processor 134 subsequently generates a pitch adjustment signal that is used to adjust the pitch of the audio signal being input from the audio source 110 so that a key of notes being input from the audio source 110 coincides with a key of notes input via the microphone/line-in 120.

In another embodiment, if a key of notes being input from the audio source 110 does not coincide with a key of a human voice signal input via the microphone/line-in 120, the audio source 110 adjusts the pitch of an audio signal being input from the audio source to match the key of human voice signal.

The pitch changer 136 changes the pitch of a note being reproduced from the audio source 110 into the pitch of a note input via the microphone/line-in 120 according to the pitch adjustment signal produced by the key processor 134.

Figure 3:
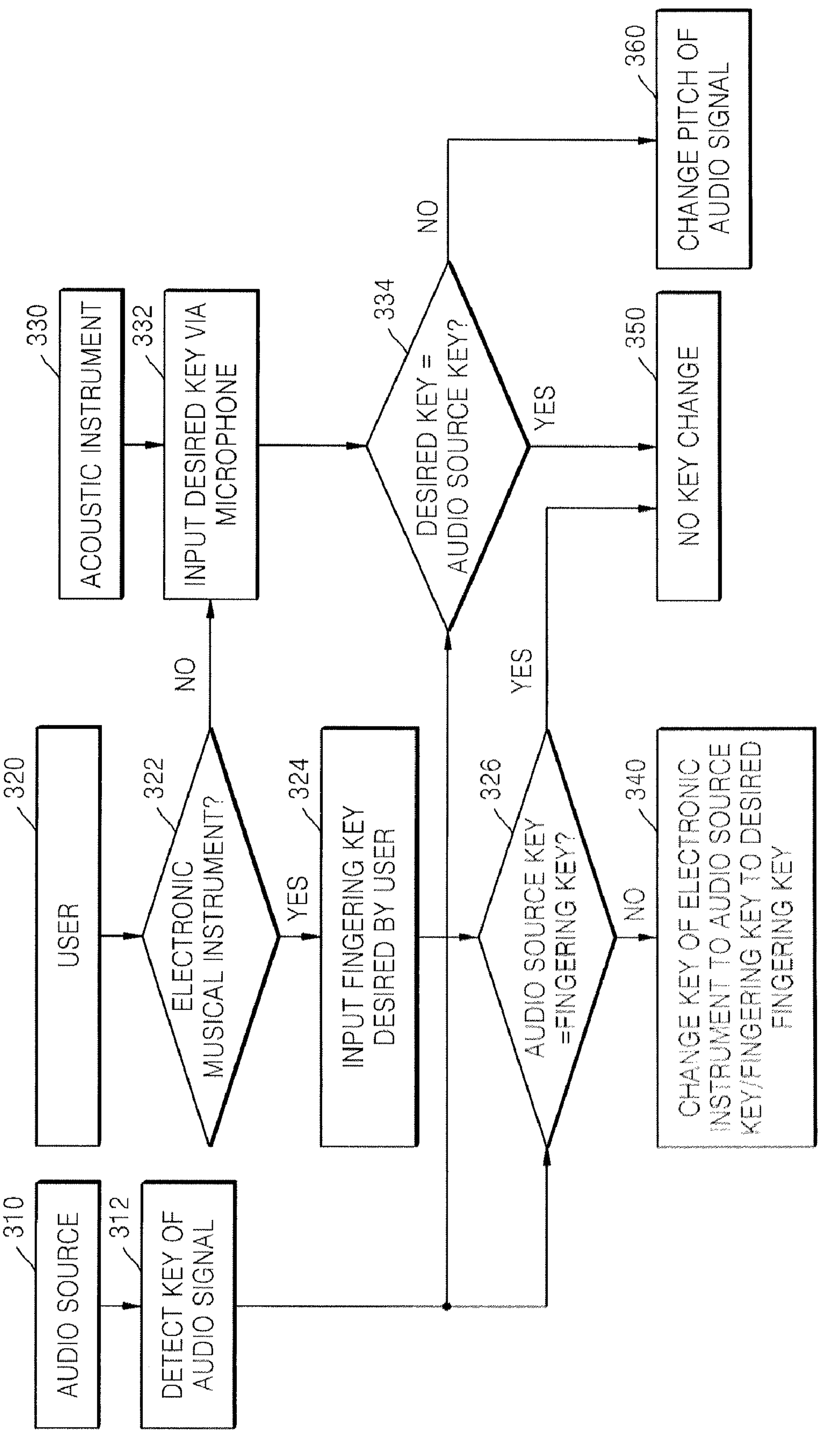
FIG. 3 is a flowchart illustrating a method of matching keys between music being reproduced and music being performed according to an embodiment of the present general inventive concept.

FIG. 3 is a flowchart illustrating a method of matching keys between music being reproduced and music being performed according to an embodiment of the present general inventive concept.

Referring to FIG. 3, an audio signal is produced by an audio source (Operation S310). Then, signal processing such as frequency analysis is performed to detect a key of the audio signal (Operation S312). If a user plays a musical instrument in operation S320, a check is made as to whether the musical instrument is an electronic musical instrument (Operation S322). If the musical instrument is an electronic musical instrument, a desired fingering key is input by the user (Operation S324). Subsequently, the key of audio signal produced by the audio source is compared with the fingering key designated by the user (Operation S326).

If the key of the audio signal does not coincide with the designated fingering key, a transposition is performed to change a key of a note from the electronic musical instrument to the key of the audio signal produced by the audio source. Alternatively, transposition is performed to change a keyboard fingering key to the fingering key designated by the user. Thus, an audio reproduction system allocates the key desired by the user to the keyboard so that the electronic musical instrument is played in the key of the audio signal. Conversely, if the key of the audio signal coincides with the designated fingering key, no change is made to the key (Operation S350).

Alternatively, if a user plays an acoustic musical instrument (Operation S330), a key of a note from the acoustic musical instrument being played is detected through a microphone or a desired key is input via the microphone (Operation S332). For example, the user may enter a root note of each key on the acoustic musical instrument in order to input the desired key.

Subsequently, the key in which the acoustic musical instrument is played is compared with the key of the audio signal produced by the audio source (Operation S334).

If the key of the acoustic musical instrument does not coincide with the key of the audio signal, the pitch of the audio signal is changed so that the two keys coincide with each other (Operation S360). Thus, the audio reproduction system changes the pitch of the audio signal to the desired key so that the key of the acoustic musical instrument coincides with the key of the audio signal.

Conversely, if the key of the acoustic musical instrument coincides with the key of the audio signal, no change is made to the key (Operation S350).

As described above, the present embodiment can provide a practice environment convenient to a user who plays or needs to practice a musical instrument. The present general inventive concept also allows automatic matching between the keys of pieces of music being reproduced and being performed, thus providing a pleasing effect of concerted music. The present general inventive concept also allows the key of music being performed by a karaoke apparatus to match the first note of a song sung by a user.

The general inventive concept can also be embodied as computer-readable codes on a computer-readable recording medium. The computer-readable medium can include a computer-readable recording medium and a computer-readable transmission medium. The computer-readable recording medium is any data storage device that can store data which can thereafter be read by a computer system. Examples of the computer-readable recording medium include read-only memory (ROM), random-access memory (RAM), CD-ROMs, magnetic tapes, hard disks, floppy disks, flash memories, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this present general inventive concept has been particularly illustrated and described with reference to preferred embodiments thereof, it will be understood by those of ordinary skill in the art that various changes in form and details may be made therein without departing from the spirit and scope of the general inventive concept as defined by the appended claims. Therefore, the scope of the general inventive concept is defined not by the detailed description of the general inventive concept but by the appended claims, and all differences within the scope will be construed as being included in the present general inventive concept.

What is claimed is:

1. A method of automatically matching keys between music being reproduced and music being performed, the method comprising:
- detecting a key from an audio signal being reproduced from a storage medium or an audio source;
- detecting a key output from an electronic musical instrument controlled by a user; and
- performing a transposition by adjusting the key of the musical instrument to match the detected key of the audio signal.

2. The method of claim 1, wherein the detecting of the key from the audio signal comprises:
- analyzing frequency characteristics of the audio signal being reproduced and extracting the key from a fundamental component of the frequency characteristics.

3. The method of claim 1, further comprising:
- notifying a user interface about the detected keys of the audio signal and the electronic musical instrument.

4. The method of claim 1, wherein the adjusting of the key of the musical instrument to match the key of the audio signal comprises:
- determining that the detected key of the audio signal does not coincide with a fingering key of the electronic musical instrument input by the user; and
- delivering key change information to the electronic musical instrument via a communication channel.

5. An apparatus to automatically match keys between music being reproduced and music being performed, the apparatus comprising:
- a key detecting unit to detect keys of an audio signal produced by an audio source and to detect a key of an output from an electronic musical instrument; and
- a key processing unit to transmit to the electronic musical instrument key data to transpose the key output from the electronic musical instrument to correspond to the detected key of the audio signal.

6. An audio reproduction system, comprising:
- a signal processor to detect a key from an audio signal being reproduced from an audio source;
- a user interface to output the key detected by the signal processor or to input user information; and
- a communication interface to transmit key information with an electronic musical instrument via a predetermined communication protocol,
- wherein the signal processor detects a key output from the electronic musical instrument and transmits to the electronic musical instrument key data to transpose the key output from the electronic musical instrument to correspond to the detected key of the audio signal.

7. The system of claim 6, wherein the signal processor comprises:
- a key detector to detect keys of the audio signal being reproduced from the audio source and the sound signal representing music being generated by the user;
- a key processor to compare the key of the audio signal with the key of the sound signal, to generate key change information and a pitch adjustment signal used to adjust a pitch of the audio signal, and to transmit the key change information to the electronic musical instrument connected via a communication channel; and
- a pitch changer to adjust the pitch of the audio signal according to the pitch adjustment signal.

8. The method of claim 1, further comprising:
- receiving a user input to indicate a desired key fingering of the electronic musical instrument different from the detected key of the audio signal,
- wherein adjusting of the key of the musical instrument to match the key of the audio signal comprises outputting from the electronic musical instrument a signal corresponding to the key of the audio signal when the user inputs fingering corresponding to the desired key fingering.

9. A non-transitory computer-readable medium having embodied thereon a computer program executable by a computer to execute a method, the method comprising:
- detecting a key from an audio signal being reproduced from a storage medium or an audio source;
- detecting a key output from an electronic musical instrument controlled by a user; and
- performing a transposition by adjusting the key of the electronic musical instrument to match the detected key of the audio signal.

10. An electronic musical instrument, comprising:
- an audio source; and
- a signal processor to detect keys from an audio signal being reproduced from the audio source and a fingering signal generated by a user, and to adjust the key of the fingering signal to correspond to the key of the audio signal.

11. The electronic musical instrument of claim 10, wherein the signal processor communicates with a user interface to output the keys detected by the signal processor or to input user information.

12. The electronic musical instrument of claim 10, wherein the signal processor communicates with an amplifier to amplify a signal received from the signal processor and input the signal to a multi-channel speaker.

* * * * *